US012321783B2

(12) United States Patent
Nakfour

(10) Patent No.: US 12,321,783 B2
(45) Date of Patent: Jun. 3, 2025

(54) SCHEDULING AND RESOURCE MANAGEMENT BASED ON APPLICATION PROFILING

(71) Applicant: NVIDIA Corporation, Santa Clara, CA (US)

(72) Inventor: Juana Nakfour, Hawthorn Woods, IL (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/500,001

(22) Filed: Nov. 1, 2023

(65) Prior Publication Data

US 2025/0138889 A1    May 1, 2025

Related U.S. Application Data

(63) Continuation of application No. 18/497,840, filed on Oct. 30, 2023.

(51) Int. Cl.
*G06F 9/50* (2006.01)
(52) U.S. Cl.
CPC .................. *G06F 9/5027* (2013.01)
(58) Field of Classification Search
CPC .................................................. G06F 9/5027
See application file for complete search history.

(56) References Cited

U.S. PATENT DOCUMENTS

| 9,705,821 | B1* | 7/2017 | Jain ....................... H04L 47/83 |
| 9,882,836 | B2* | 1/2018 | Baughman ............. H04L 47/83 |
| 10,031,785 | B2* | 7/2018 | Gonzalez ............. G06F 9/5083 |
| 10,489,215 | B1* | 11/2019 | Wen ......................... G06F 9/50 |

(Continued)

OTHER PUBLICATIONS

M. Ghobaei-Arani et al. "An autonomous resource provisioning framework for massively multiplayer online games in cloud environment", Journal of Network and Computer Applications 142 (2019), available online Jun. 7, 2019, 22 pages. (Year: 2019).*

(Continued)

*Primary Examiner* — G. C. Neurauter, Jr.
(74) *Attorney, Agent, or Firm* — Freestone Intellectual Property Law PLLC

(57) ABSTRACT

In various examples, each hosted application may be modeled with a corresponding application-specific resource consumption model that predicts a measure of that application's anticipated resource utilization at some future time based on an input representation of one or more features of the current state of an instance of the hosted application. For cloud gaming, those features may include the current level being played, current obstacles, user results playing the level or obstacles, metadata quantifying one or more aspects of the level or obstacles, game progress, etc. As such, application-specific models may be used to predict resource demands at a future time and schedule resource allocations accordingly. The present techniques may be used to manage and reallocate resources for applications such as game streaming applications, remote desktop applications, simulation applications (e.g., an autonomous or semi-autonomous vehicle simulation), virtual reality (VR) and/or augmented reality (AR) streaming applications, and/or other application types.

19 Claims, 7 Drawing Sheets

(56) References Cited

U.S. PATENT DOCUMENTS

| | | | |
|---|---|---|---|
| 10,576,379 B1* | 3/2020 | Wakeford | A63F 13/73 |
| 10,743,036 B1* | 8/2020 | Farris | H04N 21/2353 |
| 10,918,941 B2* | 2/2021 | Kolen | A63F 13/79 |
| 10,938,587 B2* | 3/2021 | Griffin | H04L 12/1818 |
| 10,942,776 B2* | 3/2021 | Ma | G06F 9/5077 |
| 11,063,881 B1* | 7/2021 | Vijayasuganthan | H04L 47/748 |
| 11,077,362 B2* | 8/2021 | Agoston | A63F 13/335 |
| 11,222,261 B2* | 1/2022 | Nakfour | H04W 4/026 |
| 11,338,200 B2* | 5/2022 | Norton | A63F 13/335 |
| 11,383,169 B1* | 7/2022 | Wakeford | A63F 13/79 |
| 11,392,843 B2* | 7/2022 | Desai | H04L 67/10 |
| 11,471,764 B2* | 10/2022 | Kolen | A63F 13/355 |
| 11,489,682 B2* | 11/2022 | Griffin | H04L 12/1818 |
| 11,537,933 B2* | 12/2022 | Malan | G06Q 50/01 |
| 11,570,124 B2* | 1/2023 | Nicas | H04L 47/801 |
| 11,579,933 B2* | 2/2023 | Chen | G06N 3/04 |
| 11,605,021 B1* | 3/2023 | Khare | G06N 5/046 |
| 11,616,991 B1* | 3/2023 | Farris | H04L 67/568 725/115 |
| 11,689,472 B2* | 6/2023 | Karri | H04L 47/808 709/226 |
| 11,805,076 B2* | 10/2023 | Vadayadiyil Raveendran | H04L 41/5019 |
| 2002/0198991 A1* | 12/2002 | Gopalakrishnan | H04L 67/5681 709/227 |
| 2009/0251457 A1* | 10/2009 | Walker | G06T 11/60 345/418 |
| 2014/0113600 A1* | 4/2014 | El Gamal | H04W 28/02 455/414.3 |
| 2016/0256784 A1* | 9/2016 | Schultz | A63F 13/45 |
| 2019/0042946 A1* | 2/2019 | Sur | G06N 3/04 |
| 2019/0244137 A1* | 8/2019 | Malan | G06N 20/00 |
| 2020/0218571 A1* | 7/2020 | Chen | H04L 47/125 |
| 2021/0357835 A1* | 11/2021 | Modi | G06F 40/194 |
| 2022/0058530 A1* | 2/2022 | Lin | G06F 18/24133 |
| 2022/0094760 A1* | 3/2022 | Jang | G06F 8/63 |
| 2022/0222082 A1* | 7/2022 | Gopalakrishnan | G06F 9/44578 |
| 2023/0097508 A1* | 3/2023 | Tardieu | G06N 3/04 709/226 |
| 2023/0236897 A1* | 7/2023 | Kumar | G06F 9/505 718/104 |
| 2023/0308359 A1* | 9/2023 | Vasseur | H04L 41/5009 |
| 2023/0342658 A1* | 10/2023 | Tripathi | G06F 9/5072 |
| 2024/0020527 A1* | 1/2024 | Chisnell | G06N 3/08 |

OTHER PUBLICATIONS

Mahfoudh Saeed Al-Asaly et al. "A deep learning-based resource usage prediction model for resource provisioning in an autonomic cloud computing environment", Neural Computing and Applications (2022) 34:10211-10228, published online Nov. 11, 2021, 18 pages. (Year: 2021).*

Cagdas Ozer et al. "A machine learning-based framework for predicting game server load", Multimedia Tools and Applications (2021) 80:9527-9546, published online Nov. 11, 2020, 20 pages. (Year: 2020).*

Harichane, I., et al., "A Proposal of Kubernetes Scheduler Using Machine-Learning on CPU/GPU Cluster", Springer Nature Switzerland AG 2020, R. Silhavy (Ed.): CSOC 2020, AISC 1224, Retrieved from Internet URL: https://www.researchgate.net/publication/343533970_A_Proposal_of_Kubernetes_Scheduler_Using_Machine-Learning_on_CPUGPU_Cluster/link/61e6f3109a753545e2dd6748/download, pp. 567-580 (2020)

Al-Asaly, Mahfoudh Saeed, et al. "A deep learning-based resource usage prediction model for resource provisioning in an autonomic cloud computing environment." Neural Computing and Applications 34.13 (2022): 10211-10228, published online 11, Nov. 2021, 18 pages (Year: 2021).

Ghobaei-Arani, Mostafa et al. "An autonomous resource provisioning framework for massively multiplayer online games in cloud environment." Journal of Network and Computer Applications 142 (2019), available online Jun. 7, 2018, 22 pages (Year; 2019).

Non-Final Office Action, U.S. Appl. No. 18/497,840, Notification Date: May 9, 2024, 49 pages.

Özer, Çağdaş, et al. . "A machine learning-based framework for predicting game server load." Multimedia Tools and Applications 80.6 (2021): 9527-9546, published online Nov. 11, 2020 ( Year: 2020).

Final Office Action, U.S. Appl. No. 18/497,840, Notification Date: Sep. 25, 2024, 18 pages.

* cited by examiner

SCHEDULING AND RESOURCE MANAGEMENT BASED ON APPLICATION PROFILING

CROSS-REFERENCE TO RELATED APPLICATIONS

This application is a continuation of U.S. patent application Ser. No. 18/497,840, filed on Oct. 30, 2023, the contents of which are incorporated by reference herein in their entirety.

BACKGROUND

Scheduling and resource management are used in a variety of computing applications. For example, in data center and cloud computing operations, scheduling and resource management may be used to optimize the allocation of servers, storage, and/or networking resources to host applications, prevent overloads that can lead to downtime, and balance workloads to ensure a smooth user experience. Resource management may be used to allocate resources based on demand, migrate workloads in the presence of hardware failures, support security measures through isolation, and facilitate capacity planning. Furthermore, operating systems often employ scheduling algorithms to allocate resources such as CPU time to processes, and network management systems employ resource management for bandwidth allocation and quality of service (QOS). In many cases, scheduling and resource management can play a central role in the availability of scarce resources, the efficiency and cost of resource utilization, and the efficiency with which the underlying infrastructure is used.

However, conventional techniques have a variety of drawbacks. Some existing techniques monitor incoming traffic or resource (e.g., GPU, CPU) utilization and allocate resources in response to current demands. However, taking and responding to these measurements results in increased latency (e.g., scaling may involve starting up a process that is typically unavailable during start up), so some packets might be lost. Another existing technique uses historical utilization (e.g., a network traffic profile represented by the number of requests received or served at particular times of the day) to model the demand for future resource utilization and allocate resources to accommodate the predicted resource utilization. However, this type of model for demand is not perfect and can lead to issues such as underutilization or overutilization. Underutilization typically results in inefficiency, wasted energy, and increased operational costs as valuable hardware remains unused or underused. Underutilization can also limit the scalability and responsiveness of systems, to the extent available computing resources are not fully leveraged to handle increasing workloads or sudden spikes in demand, which can lead to performance bottlenecks during peak demand. Conventional demand modeling and resource allocation techniques can also result in overutilization of computing resources. When a resource allocation does not match the actual demand, some components or servers may be heavily (over) loaded while others remain underutilized. Overutilization of computing resources may lead to performance degradation, increased risk of system failures, excessive power consumption, hardware wear and tear, and decreased reliability and efficiency. More generally, conventional demand modeling and resource allocation techniques can result in inefficient resource allocation, reduced system performance, and potential resource contention issues, all of which can negatively impact an organization's ability to deliver reliable and responsive services. As such, there is a need for improved demand modeling and resource allocation techniques.

SUMMARY

Embodiments of the present disclosure relate to scheduling and resource management based on user and application profiling. Systems and methods are disclosed that model resource utilization on a per-user basis using a corresponding user-specific resource consumption model for each user, and/or on a per-application basis using a corresponding application-specific resource consumption model for each application (or each version of each application).

More specifically, and in contrast to conventional systems, such as those described above, each application user may be modeled with a corresponding user-specific resource consumption model that predicts a measure of that application user's anticipated resource consumption at some future time (e.g., in 3 seconds, 5 minutes), and each application (e.g., each cloud-hosted video game title) may be modeled with a corresponding application-specific resource consumption (e.g., game) model that predicts a measure of that application's anticipated resource consumption at some future time (e.g., in 3 seconds, 5 minutes). As such, user and/or application models may be used to predict resource demands at a future time and reallocate resources accordingly. The present techniques may be used to manage and reallocate resources for applications such as game streaming applications (e.g., NVIDIA® GEFORCE® NOW), remote desktop applications, simulation applications (e.g., an autonomous or semi-autonomous vehicle simulation), virtual reality (VR) and/or augmented reality (AR) streaming applications, and/or other application types.

BRIEF DESCRIPTION OF THE DRAWINGS

The Present Systems and Methods for Scheduling and Resource Management Based on User and Application Profiling are Described in Detail Below with Reference to the Attached Drawing Figures, Wherein.

DETAILED DESCRIPTION

Figure 1:
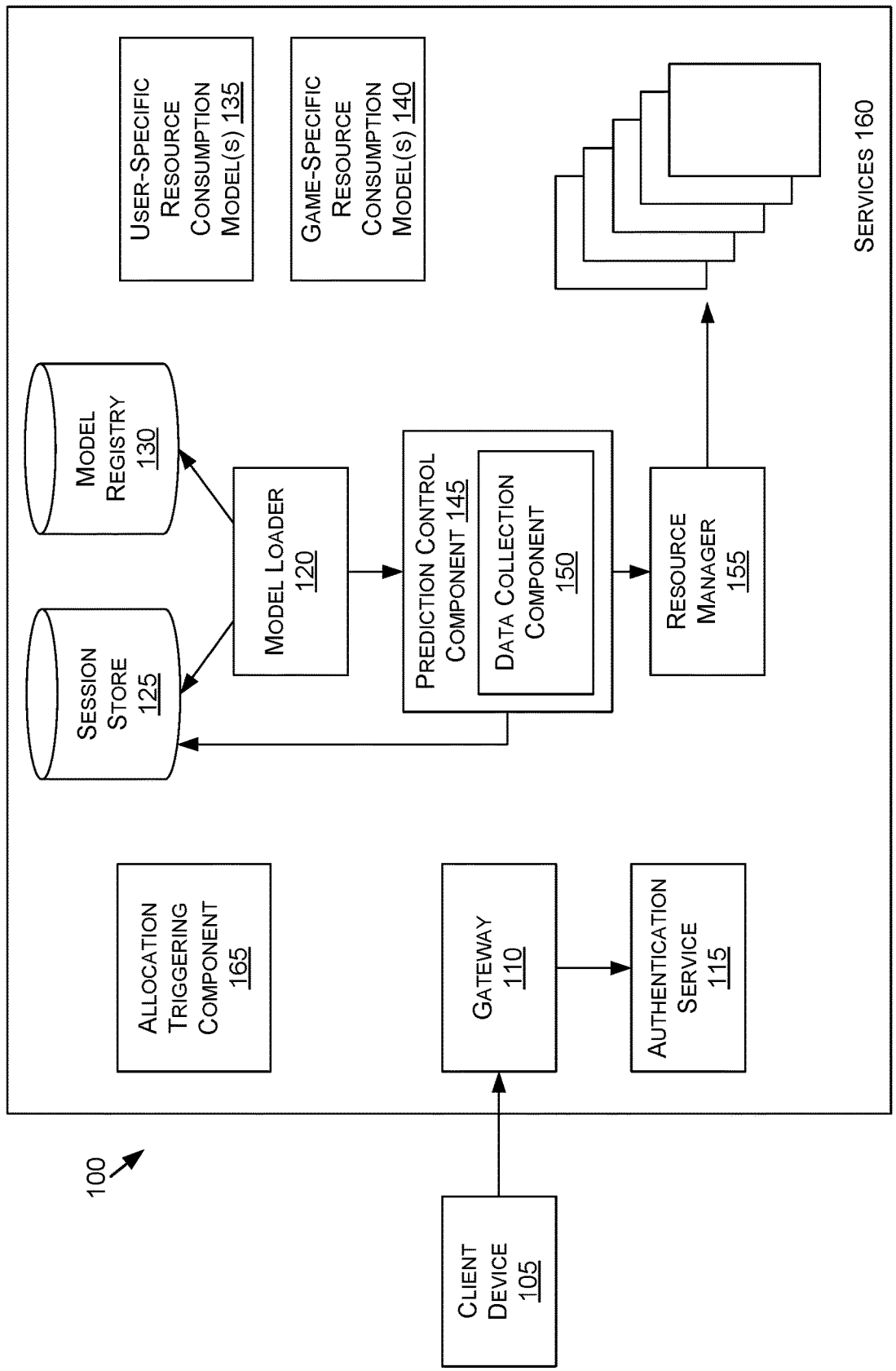
FIG. 1 is a block diagram of an example distributed computing environment with a resource manager, in accordance with some embodiments of the present disclosure.

Systems and methods are disclosed relating to scheduling and resource management based on user and application profiling. For example, each application user may be modeled with a corresponding user-specific resource consumption model that predicts a measure of that application user's anticipated resource consumption at some future time (e.g., in 3 seconds, 5 minutes), and each application (e.g., each cloud-hosted video game title) may be modeled with a corresponding application-specific resource consumption (e.g., game) model that predicts a measure of that application's anticipated resource consumption at some future time (e.g., in 3 seconds, 5 minutes). As such, user and/or application models may be used to predict resource demands at a future time and reallocate resources accordingly. The present techniques may be used to manage and reallocate resources for applications such as game streaming applications (e.g., NVIDIA GEFORCE NOW), remote desktop applications, simulation applications (e.g., an autonomous or semi-autonomous vehicle simulation), virtual reality (VR) and/or augmented reality (AR) streaming applications, and/or other application types.

One possible application in which the present techniques may be used is in content streaming. Content streaming, which could include multimedia (video and audio) streaming, collaborative content creation, and cloud gaming, also known as game streaming or cloud gaming services, hosts content on remote servers located in data centers. These servers are typically equipped with high-performance graphics cards and CPUs, serving as the infrastructure where the content is stored or the software applications are installed and run. Users may access and play games and other applications or content through client software or apps on their devices such as low-end PCs, smartphones, tablets, and smart TVs. In the cloud gaming or collaborative content creation scenario, when a user selects a game or content creation application, a request may be sent to a cloud server hosting that specific title. An instance of the game or content creation application runs on the server, and the video and audio output may be encoded in real-time and streamed to the user's device. User input, such as keyboard, mouse, or controller commands, may be transmitted to the cloud server, which may process these inputs and updates the instance accordingly, creating a responsive user experience. The quality of the stream, including resolution and frame rate, typically depends on the user's internet connection speed and the capabilities of the cloud server. This approach reduces or eliminates the need for users to own and maintain high-end computing hardware and allows them to enjoy gaming experiences and responsive collaborative creation capabilities on devices that may not have the processing power to run the games locally.

In some embodiments, a provider or operator of a cloud-based network environment or other distributed computing environment that hosts one or more applications such as a game streaming application that streams one or more cloud gaming titles may provision resources within the distributed computing environment using one or more user-specific and/or application-specific (e.g., game-specific) resource consumption models. Taking cloud gaming as an example, each user may be modeled with a corresponding user-specific resource consumption model that predicts a measure of that application user's anticipated (e.g., processing, memory or storage, and/or networking) resource utilization at some time in the future based on a representation of one or more features of the user's current session (e.g., length of play, time of day, login time, a statistical measure of the resource utilization associated with the current session), game or application setup (e.g., gameplay or audio settings), skill or experience level (or some other representation of anticipated speed of gameplay), social media activity (e.g., whether the user is browsing or messaging in a page, channel, room, or discussion board associated with gaming or the active game they are playing; a measure of messaging activity on such a page, channel, room, or discussion board), some time series representing feature(s) for a series of interactions, and/or other characteristics. In some embodiments, the user resource consumption model may be used to predict an anticipated resource consumption before the user has logged in. For example, the user resource consumption model may be run periodically (e.g., once for each time interval) and/or based on some triggering event (e.g., one or more cluster metrics exceeding a corresponding threshold) to predict whether that user is anticipated to demand resources at some point in the future, even though the user has not logged in yet, effectively predicting (e.g., based on the current time of day) when that user is likely to login and demand resources.

Additionally or alternatively, each hosted application title (e.g., each hosted cloud gaming application or content creation application title), or each version of each hosted application title, may be modeled with a corresponding application-specific (e.g., game-specific) resource consumption model that predicts a measure of that application's anticipated (e.g., processing, memory or storage, and/or networking) resource utilization at some time in the future based on a representation of one or more features of the current state of the application. In the cloud gaming example, the current state of a game may be represented using features such as current level in the game, a representation (e.g., classification) of one or more present obstacles, user results playing a corresponding level(s) and/or obstacle(s) (e.g., a binary measure of pass/fail, elapsed time between checkpoints, heath or other resources remaining or consumed, etc.), metadata quantifying one or more aspects of a corresponding level(s) and/or obstacle(s) (e.g., level and/or obstacle difficulty, current and/or historical resource consumption associated with that level or obstacle), game progress (e.g., percent completion), some combination thereof, and/or other features.

In an example implementation, a resource allocation may be determined and/or applied based on various triggering events. Example triggering events include each user login, each time a user loads and/or changes a cloud-hosted application (e.g., changes a cloud-hosted game), each time a user levels up (e.g., reaches some experience level) in a game, each time a user changes their gaming setup or other designated application settings, each time a user successfully reaches a new level, region, or zone in a current game, each interval of time (e.g., once every N minutes), a determination that one or more (e.g., cluster) metrics exceeds or falls below a corresponding threshold (e.g., resource utilization exceeds some threshold such as 75% GPU utilization), and/or others.

Taking a user login to a cloud service as an example triggering event, in some embodiments, once a particular user logs in, the user-specific resource consumption model for that user and/or the application-specific resource consumption model for that user's most recently used application may be loaded and served (if it is not already being served). The user-specific resource consumption model may be used to predict a measure of that user's anticipated resource utilization, and/or the application-specific resource consumption model may be used to predict a measure of that application's anticipated resource utilization (e.g., resuming from the level or other point at which the user last left) at some future time (e.g., some designated number of seconds or minutes in the future). In some embodiments, once an application-specific resource consumption model is loaded (e.g., onto some server that provides an application programming interface (API) endpoint for inference), that application-specific resource consumption model may be used to iteratively predict an anticipated resource utilization for any number of instances of the corresponding application that are being hosted in the cloud, and/or for different future times. Additionally or alternatively, once a user-specific resource consumption model is loaded, it may be used to iteratively predict an anticipated resource utilization for the corresponding user for different future times. In embodiments that use predictions from both user-specific and resource-specific consumption models, the predictions may be combined in any suitable manner (e.g., averaging), the models may be chained to generate a single predicted resource consumption, and/or otherwise.

As such, resources may be allocated based on the predicted resource consumption for that user, the predicted resource consumption for that application, and/or current resource availability. For example, one or more services or other functions may be launched or scaled with designated resource allocations and/or constraints (e.g., re-allocating resources to users and/or applications with higher predicted resource consumption), one or more services or other functions may be assigned to particular machines (e.g., nodes, virtual machines) that have current availability, one or more nodes may be added to a cluster (e.g., if the current cluster does not have enough or a desired amount of resources to support the predicted resource consumption), and/or otherwise. Examples of services or other functions that may be launched or scaled include a microservice of the application (e.g., application or game services such as application- or game-hosting servers), a microservice that otherwise facilitates execution and/or delivery of the application, a pod or container that runs a microservice such as one of the foregoing, a component of a resource provisioning or orchestration application or platform (e.g., a service, deployment, volume, pod, or container of KUBERNETES®), and/or otherwise. By way of nonlimiting example, one or more game servers (e.g., running in a corresponding pod or container) may be launched or scaled with designated resource allocations and/or constraints based on the predicted resource consumption for that user, the predicted resource consumption for that application, and/or current resource availability.

As such, the techniques described herein may be utilized to predict resource demands at a future time for a particular application user (e.g., based on one or more features of the user's current session, game or application setup, skill or experience level) and/or for a particular application (e.g., based on the current state of the application) and reallocate resources accordingly. The present techniques effectively improve demand modeling, resulting in more efficient resource allocations, improved system performance, less risk of resource contention, and improved reliability and responsiveness of hosted applications.

With reference to FIG. 1, FIG. 1 is an example distributed computing environment 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Figure 6:
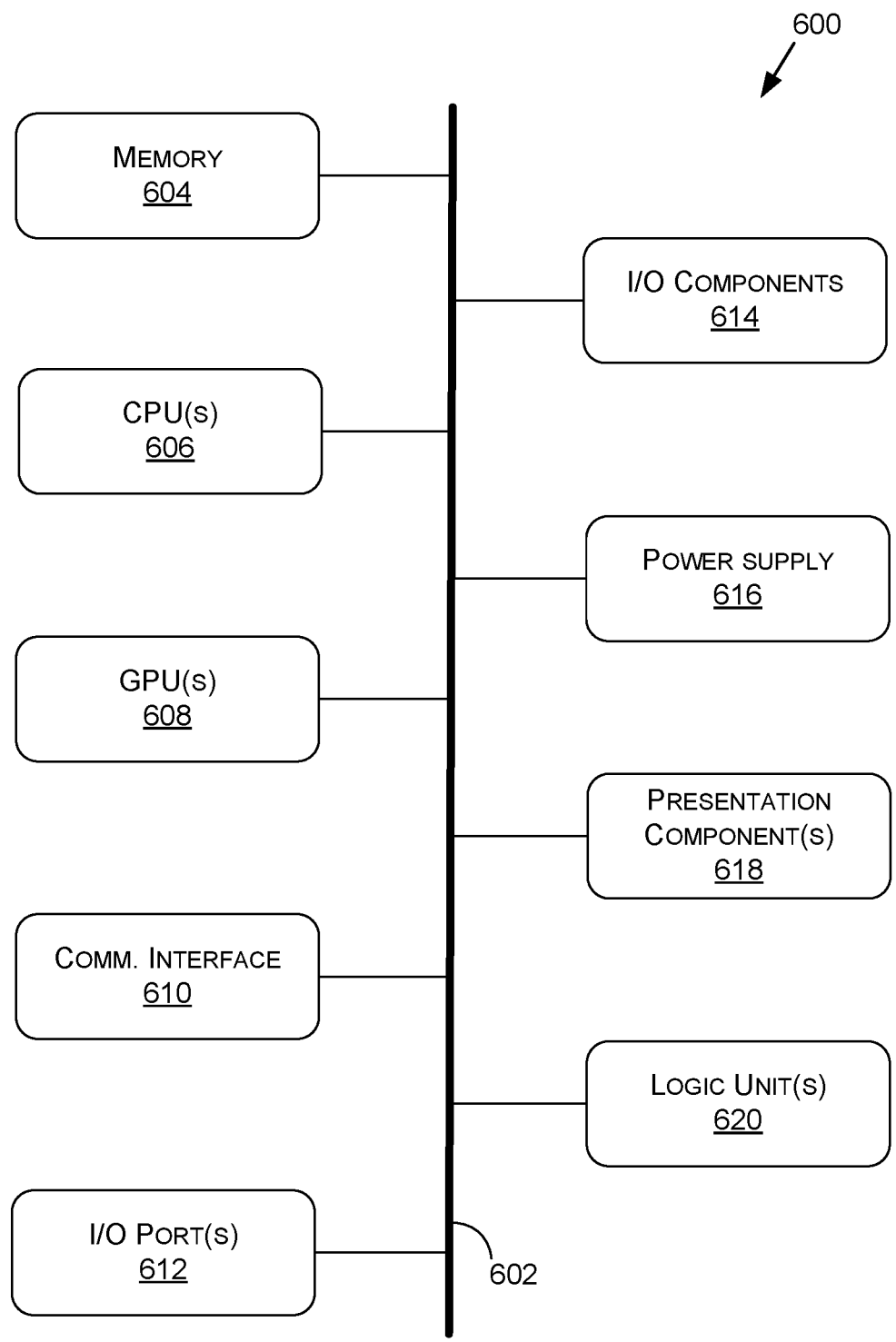
FIG. 6 is a block diagram of an example computing device suitable for use in implementing some embodiments of the present disclosure.

The distributed computing environment 100 of FIG. 1 may comprise a network of nodes (which, as with other components described herein, may include similar components, features, and/or functionality to the example computing device 600 of FIG. 6) that host any type and number of services 160, such as those that implement, facilitate, and/or otherwise support data analytics, machine learning, data mining, simulation, content delivery, content rendering, data management and storage, web or cloud services or applications, streaming services, high performance computing, distributing computing, and/or virtualization, to name a few examples. The distributed computing environment 100 may be hosted in one or more data centers (e.g., the data center 700 of FIG. 7), and the illustrated portion of distributed computing environment 100 may represent some portion (e.g., a cluster of nodes) of a larger distributed computing environment.

The distributed computing environment 100 may include a resource manager 155 that provisions and manages an allocation of computing resources, such as processing resources (e.g., processing threads within a processor, individual cores of a multi-core chip, servers, virtual machines), memory or storage resources (e.g., random access memory (RAM), hard drives, solid state drives (SSDs), distributed file systems, disk input/output (I/O), memory bandwidth), networking resources (e.g., network bandwidth, network I/O) to support the services 160 (e.g., content delivery and/or streaming). The resource manager 155 may provision resources to ensure the nodes of the distributed computing environment 100 have the necessary capabilities to execute tasks efficiently. For example, the resource manager 155 may break down larger jobs into tasks, select and allocate processing resources for each task, and determine an optimal time for task execution.

In some embodiments, the distributed computing environment 100 may host cloud applications or other cloud services using containers and/or containerized applications. Generally, containerization may involve encapsulating an application or a segment of an application (e.g., a microservice) along with its dependencies, libraries, and/or configuration files in a self-contained unit known as a container, which facilitates running the application or microservice consistently across different computing environments. Multiple containers may be deployed on a single host operating system on a node and/or virtual machine, and may share various resources such as processing resources (e.g., CPU, GPU), memory or storage resources (e.g., memory bandwidth), and/or networking resources. As such, the resource manager 155 may use a container orchestration engine such as KUBERNETES to manage and coordinate deployment, scaling, scheduling, load balancing, supporting resource allocations, health monitoring, and/or other operations associated with containerized applications. In the context of KUBERNETES, a pod is the basic unit of deployment, and may encapsulate one or more containers that are deployed and scheduled together on a single node. In this example, the services 160 may additionally or alternatively include any number of KUBERNETES microservices, and the resource manager 155 may deploy and/or manage the any of the services 160 in one or more corresponding containers and/or pods. Accordingly, the resource manager 155 may allocate resources such as containers, pods, and/or other resources that support allocated containers or pods (e.g., processing resources, memory or storage resources, networking resources).

Figure 5:
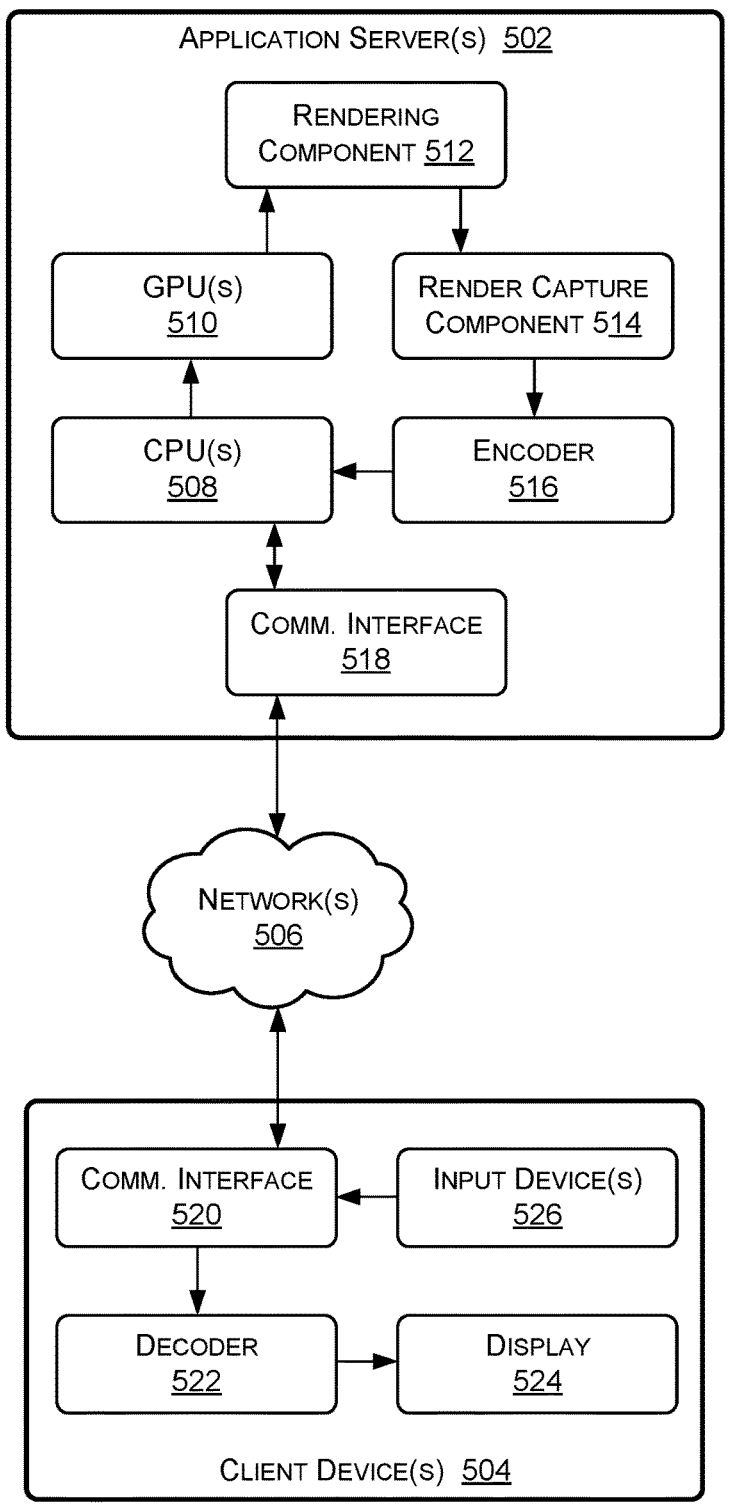
FIG. 5 is a block diagram of an example content streaming system suitable for use in implementing some embodiments of the present disclosure.

One possible application in which the present techniques may be used is in content distribution and/or streaming, such as cloud gaming or cloud content streaming. In some embodiments, the distributed computing environment 100 may implement some or all of a content distribution and/or streaming system, which may host one or more applications such as a game streaming application that streams one or more cloud gaming titles to various cloud gaming users, or a collaborative content creation platform that facilitates simultaneous creation and revision of assets (e.g., documents such as articles, reports, presentations, or spreadsheets; databases; visual assets such as images, graphics, or illustrations; audio assets such as recordings, music, or sound effects; videos or animations; interactive assets such as web applications or simulations; 3D assets such as 3D models, AR or VR environments, AR or VR experiences; etc.) across multiple heterogeneous applications (e.g., such that the collaborative content creation platform supports collaborative creation and/or revision of asset(s) by users who may be using different currently executing content creation applications to contribute to the content creation process). An example content streaming system 500 with one or more application server(s) 502 (e.g., cloud servers) that may host an application (e.g., a video game) is illustrated in FIG. 5.

For example, the distributed computing environment 100 (e.g., which may implement or comprise a game streaming platform, such as NVIDIA GEFORCE NOW) may include a gateway 110. Any known gateway functionality may be implemented. For example, the gateway 110 may route messages between different components of distributed computing environment 100, perform protocol conversion, data translation, and/or security checks (e.g., implementing firewalls, encryption, authentication, etc.). In some embodiments, the gateway 110 coordinates with an authentication service 115 with which a (e.g., cloud gaming) user operating a client device 105 may authenticate themselves. Any known authentication technique may be implemented. For example, when a request arrives, the gateway 110 may check whether its source has been previously authenticated (e.g., based on token or a session identifier indicating that the requester is authorized). If not, the gateway 110 may redirect the request to the authentication service 115, which may verify the identity of the requester (e.g., using passwords, digital certificates, biometric data, etc.), generate a token or a session identifier indicating that the requester is authorized, and pass the token or session identifier back to the gateway 110. As such, the gateway 110 may use the token or session identifier to verify that the request (and future requests from the same source) have been previously authenticated.

Continuing with a cloud gaming implementation as an example, when a request from an authenticated cloud gaming user or account initiates gameplay of a particular game, the gateway 110, the authentication service 115, or some other component may inform the resource manager 155, which may allocate one or more services 160 to support that game (e.g., by allocating a server, virtual machine, container, pod, and/or other supporting resources to run the game). In this example, the services 160 may additionally or alternatively include any number of game services supporting any number of game titles, game instances, cloud gaming users, game builds, and/or other aspects (e.g., game servers, matchmaking services, game data storage, real-time communication, content delivery, lobby management, etc.). Generally, the resource manager 155 may deploy and/or manage any of the services 160 (e.g., whether a game service; a microservice of a service provisioning, deployment, scaling, or management application; and/or some other microservice of the distributed computing environment 100 that facilities execution and/or delivery of the game) in one or more corresponding containers and/or pods. This is meant simply as an example, and the distributed computing environment 100 may additionally or alternatively host other types of cloud services and/or applications.

In some embodiments, the resource manager 155 may provision resources within the distributed computing environment 100 using predicted resource utilizations generated using one or more user-specific (or account specific) resource consumption models (e.g., the user-specific resource consumption model(s) 135) and/or one or more application-specific (e.g., game-specific) or application version-specific (e.g., game version-specific) resource consumption models (e.g., the game-specific resource consumption model(s) 140). Continuing with cloud gaming as an example, each cloud gaming user may be modeled with a corresponding user-specific resource consumption model that predicts a measure of that cloud gaming user's anticipated resource utilization, and each hosted cloud gaming title (or each version of each hosted cloud gaming title) may be modeled with a corresponding game-specific (or version-specific) resource consumption model that predicts a measure of that game's anticipated resource utilization. Generally, any or all of these models may be implemented using a corresponding neural network, although this is not intended to be limiting. For example, any or all of these models may be implemented using any type of a number of different networks or machine learning models, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, transformer, recurrent, perceptrons, Long/Short Term Memory (LSTM), Hopfield, Boltzmann, deep belief, de-convolutional, generative adversarial, liquid state machine, etc.), and/or other types of machine learning models.

In an example implementation, at a high level, an allocation triggering component 165 may determine to use the user-specific resource consumption model(s) 135 and/or the game-specific resource consumption model(s) 140 to predict a future resource consumption and schedule a corresponding resource allocation at a corresponding future time. Accordingly, the allocation triggering component 165 may trigger a process by which a model loader 120 may load an applicable model (if it has not already been loaded), a prediction control component 145 may encode a corresponding input for the model and apply the input to the model to predict a corresponding future resource consumption. As such, the resource manager 155 may determine an appropriate resource allocation based on the predicted future resource consumption, and may schedule and trigger the resource allocation at the corresponding future time.

Generally, the allocation triggering component 165 may trigger a predicted future resource consumption and scheduling of a corresponding resource allocation in various ways. For example, the allocation triggering component 165 may trigger a predicted future resource consumption for any or all cloud gaming users using a corresponding one of the user-specific resource consumption model(s) 135 for each cloud gaming user, and/or for any or all (e.g., versions of any or all) cloud gaming titles using a corresponding one of the game-specific resource consumption model(s) 135 for each (e.g., version of a) cloud gaming title, for example, periodically (e.g., once for each time interval) and/or based on some other triggering event. In an example embodiment, the allocation triggering component 165 (and/or some other component or microservice of the distributed computing environment 100) may monitor one or more metrics that quantify node and/or cluster performance (e.g., resource utilization (e.g., CPU, memory, and/or disk usage), throughput, latency, error rates, availability or uptime, etc.), and trigger a prediction and corresponding resource allocation based on determining that one or more cluster and/or node metrics exceed a corresponding threshold (e.g., a cluster or node resource utilization exceeds some threshold such as 70 or 80%). For example, if the allocation triggering component 165 determines that a threshold has been exceeded for a particular cluster or node, the allocation triggering component 165 may trigger a prediction and corresponding resource allocation for one or more (e.g., all) of the cloud gaming users and/or hosted game titles being served by that particular cluster or node.

Depending on the implementation, scenario, time of day, and/or other factors, there may be any number (e.g., hundreds or thousands) of cloud gaming users and/or cloud gaming titles being hosted at any given time. As such, the periodicity or other triggering of a reallocation for any or all cloud gaming users and/or cloud gaming titles may be synchronized, interleaved, spaced out, and/or otherwise coordinated. For example, the allocation triggering component 165 may trigger prediction(s) and corresponding resource allocation(s) using some number (e.g., hundreds) of models (e.g., for hundreds of users or cloud gaming titles) after each interval of time (e.g., five minutes) has elapsed, and the allocation triggering component 165 may trigger prediction(s) and corresponding resource allocation(s) using some number (e.g., hundreds) of other models (e.g., for hundreds of other users or cloud gaming titles) using a similar interval of time (e.g., five minutes) but offset from the first set of predictions (e.g., by some number of seconds like 15 or 30 seconds). In this manner, the allocation triggering component 165 may interleave (e.g., periodic) predictions and resource allocations for waves of users and applications. In some embodiments, the allocation triggering component 165 may trigger predictions and resource allocations based on there being less than some threshold number of predictions and resource allocations to implement (e.g., trigger predictions and resource allocations for 10 users/games being hosted by a particular node at all once). In some embodiments, the allocation triggering component 165 may interleave predictions and resource allocations for waves of users and applications based on there being more than some threshold number of predictions and resource allocations to implement (e.g., separating some larger number of predictions and resource allocations such as 100 into smaller waves such as 10 users/games at time).

In some embodiments, the allocation triggering component 165 may trigger prediction(s) and corresponding resource allocation(s) for cloud gaming users that are currently logged into the distributed computing environment 100 (e.g., logged into the game streaming platform) and/or for cloud gaming users that are not currently logged in. Regarding prediction(s) and corresponding resource allocation(s) for cloud gaming users that are not currently logged in, those predictions may effectively serve to predict whether each cloud gaming user is expected to log in and demand resources at a corresponding future time.

In some embodiments, the allocation triggering component 165 may trigger a prediction and corresponding resource allocation for a particular cloud gaming user based on detecting (e.g., being informed by the gateway 110 and/or the authentication service 115) that that cloud gaming user has logged in. For example, the allocation triggering component 165 may trigger a prediction using the user-specific resource consumption model(s) 135 for that user and/or using the game-specific resource consumption model(s) 140 for the last game that user played, a representation of which may be stored and looked up from a session store 125 by the allocation triggering component 165 (or the model loader 120). In some embodiments, the allocation triggering component 165 may trigger a prediction and corresponding resource allocation for a particular user and/or cloud gaming title each time a cloud gaming user loads and/or changes a cloud gaming title, each time the user levels up (e.g., reaches some experience level) in a game, each time the user changes their gaming setup or other designated application settings, each time a user successfully reaches a new level in the game, and/or otherwise.

Regardless of how or when the allocation triggering component 165 triggers a prediction and corresponding resource allocation, the allocation triggering component 165 may trigger the model loader 120 to determine whether an applicable model is currently being served, and if not, to load it from a model registry 130. Generally, the model registry 130 may store any number of user-specific resource consumption model(s) 135 and/or game-specific resource consumption model(s) 140. However, depending on the embodiment and/or the scenario, there may not be a need to serve all models all the time. For example, if a particular cloud gaming user is not logged in, or if a particular cloud gaming title (or version thereof) is not currently being hosted, it may not be desirable to host the model(s) for that cloud gaming user or that cloud gaming title. As such, when the model loader 120 determines that a prediction has been instructed (e.g., by the allocation triggering component 165) for a user, title, or version corresponding to a model that is not currently being served, the model loader 120 may load one or more corresponding models from the model registry 130 onto a server that provides an API endpoint for inference. For example, the allocation triggering component 165 may provide the model loader 120 with an indication that a prediction should be made for a particular user, and the model loader 120 may load or lookup the API endpoint for the user-specific resource consumption model for that user. In another example, the allocation triggering component 165 or the model loader 120 may look up the current or most recently played game for that user from the session store 125, and the model loader 120 may load or lookup the API endpoint for the game-specific resource consumption model for that (version of that) game. As such, the model loader 120 may provide one or more downstream components (e.g., the prediction control component 145, the resource manager 155) with the address for, or some other identification of, the API endpoint for a particular model and an instruction to use the model to generate a prediction. These are just a few examples, and other variations are contemplated within the scope of the present disclosure.

Accordingly, the prediction control component 145 may receive an instruction to predict a future resource consumption using a corresponding model, and in response, may use a data collection component 150 to retrieve the requisite data for that model, encode that data into a format that the model understands, and apply the encoded input to the API endpoint for that model to trigger and return the prediction.

Taking one of the user-specific resource consumption model(s) 135 for a particular cloud gaming user as an example, that user's resource consumption model may predict a representation of a measure of that cloud gaming user's anticipated (e.g., processing, memory or storage, and/or networking) resource utilization at some duration of time away in the future based on an input representation of one or more features of the user's current session (e.g., length of play, time of day, login time, a statistical measure of the resource utilization associated with the current session), game or application setup (e.g., gameplay or audio settings), skill or experience level (or some other representation of anticipated speed of gameplay), social media activity (e.g., whether the user is browsing or messaging in a page, channel, room, or discussion board associated with gaming or the active game they are playing; a measure of messaging activity on such a page, channel, room, or discussion board), some time series representing feature(s) for a series of interactions, the time of day (e.g., if the use is not logged in), and/or other characteristics.

Generally, the data collection component 150 may collect this and other data in various ways. For example, the data collection component 150 may comprise or use a system process or (e.g., KUBERNETES) microservice that interfaces with a game engine being hosted for that cloud gaming user and/or interfaces with one or more components of the distributed computing environment 100 to take one or more readings (e.g., one or more features of the user's current session, game setup, skill or experience level, supported social media activity, etc.). Depending on the implementation, the data collection component 150 may execute in—or be triggered or otherwise controlled by any suitable component, such as a driver, a pod or container, a node, a virtual machine, a Hypervisor overseeing a virtual machine running a particular instance of a game, and/or some other component of the distributed computing environment 100. Additionally or alternatively, one or more of these readings may be recorded in the session store 125 by any such component and retrieved by the data collection component 150.

The prediction control component 145 may encode this data in any suitable way. For example, the prediction control component 145 may encode numbers (e.g., length of gameplay in the current session, time of day, etc.) using any known technique. The prediction control component 145 may generate and encode a statistical measure of the resource utilization associated with the current session. By way of nonlimiting example, one or measures of the current resource utilization (e.g., network bandwidth) may be quantified relative to a corresponding distribution (e.g., percentile, quartile, etc.) and encoded in any suitable way (e.g., the 99th percentile of network bandwidth usage may represent 100 megabits per second/sec at a given time, and the percentile may be encoded into a vector representation). Generally, the prediction control component 145 may quantify one or measures of the current utilization of any resource (e.g., number, percentage, and/or type of available processing resources, memory or storage resources, and/or networking resources) needed to support the user's current gameplay demands (e.g., using node and/or container metrics for the node or container that is hosting the game the user is currently playing).

In some scenarios, the current game and/or level being played may correlate with the amount of resources needed to host that game or level, so the encoded measure of the current resource utilization may include a representation (e.g., an identifier) of the current game and/or level being played. In some scenarios, one or more aspects of the user's current game setup may correlate with the amount of resources needed to host the gameplay, so the prediction control component 145 may encode a representation of one or more aspects of a current game setup (e.g., gameplay settings such as single player/multiplayer, selected load-out, gameplay resolution, graphics quality, anti-aliasing, frame rate, or aspect ratio; audio settings such as voice chat, background music, spatial audio, or subtitles being enabled/disabled; enabled light transport simulation features, such as global illumination, subsurface scattering, real-time reflections and refractions, ambient occlusion, etc.), for example, by encoding different setup states into different vector representations.

In some embodiments, the prediction control component 145 may encode a representation of the skill or experience level of the user. For example, the user may be very skilled at climbing ladders (so they climb ladders relatively quickly), but bad at swimming in the ocean (so they swim relatively slowly). Producing a rendering of a user as the user climbs a ladder may take fewer resources (due to there being less motion occurring between produced frames and less resulting changes to compute between frames) than producing a rendering of the user swimming in the ocean, so being bad at swimming and good at climbing ladders may require a relatively lower resource usage than the converse scenario. As such, one or more aspects of gameplay (or other application usage) may be categorized, the user's skill or experience level in the one or more aspects of gameplay may be quantified using any suitable technique (e.g., based on observation, experience points, experience level, etc.), and the prediction control component 145 may encode a representation of the user's skill or experience level in those aspect(s) of gameplay into a corresponding vector representation.

In some embodiments, the game engine, the game streaming platform, the distributed computing environment 100, and/or some other component may support or integrate one or more social features, enabling players to connect with friends, form gaming communities, and/or communicate through in-game chats or messaging systems. In some scenarios, social media activity may correlate with anticipated resource utilization. For example, if a user is actively looking for a walkthrough or a level key, it may be an indication that the user is going to advance to the next level of the game in the near future, and therefore, may need more resources to load the next level. As such, the prediction control component 145 may interface with the one or more social media features to detect, generate, and encode a representation of whether the user is browsing or messaging in a particular page, channel, room, or discussion board associated with gaming (or the active game they are playing), a measure of messaging activity on such a page, channel, room, or discussion board, and/or otherwise.

As such, the prediction control component 145 may generate an encoded representation of one or more features of a particular user's current session, game setup, skill or experience level, social media activity, and/or other aspects representative of that particular user's anticipated resource utilization. In some embodiments, the prediction control component 145 may generate such data for each of a series of interactions and encode the data for each interaction into a time series. As such, the prediction control component 145 may apply the resulting encoded representation as an input into the corresponding one of the user-specific resource consumption model(s) 135 for that cloud gaming user.

Accordingly, the user-specific resource consumption model for that cloud gaming user may process that input to generate a representation of how many resources that user is expected to demand at some future time. For example, the user-specific resource consumption model may be trained to predict resource utilization some duration of time in the future (e.g., 5 minutes, 10 minutes, 30 minutes, etc.). The representation of predicted resource utilization may take any suitable form and may encode any measure of predicted resource utilization. For example, the predicted resource utilization may quantify any measure of the resources (e.g., number, percentage, and/or type of available processing resources, memory or storage resources, and/or networking resources) needed to support that user's anticipated gameplay demands some duration of time away in the future. These are just a few examples, and other variations are contemplated within the scope of the present disclosure.

Taking one of the game-specific resource consumption model(s) 140 for a particular (e.g., version of a) cloud gaming title as an example, that game's resource consumption model may predict a representation of a measure of that game's anticipated resource utilization (e.g., utilization of processing resources, memory or storage resources, and/or networking resources) at some duration of time away in the future based on an input representation of one or more features of the current state of the instance of the game, such as the current level being played in that instance of the game, a representation (e.g., classification) of one or more current obstacles, user results playing a corresponding level(s) and/or obstacle(s) (e.g., a binary measure of pass/fail, elapsed time between checkpoints, heath or other resources remaining or consumed, etc.), metadata quantifying one or more aspects of a corresponding level(s) and/or obstacle(s) (e.g., level and/or obstacle difficulty, current and/or historical resource consumption associated with that level or obstacle), game progress (e.g., percent completion), some combination thereof, and/or other features that may correlate with anticipated resource utilization.

For example, the data collection component 150 may collect this and other data using any of the techniques described above (e.g., by interfacing with a game engine associated with the instance of the game and/or interfacing with one or more components of the distributed computing environment 100) to take and one or more readings (e.g., current level, obstacles, checkpoint, heath or other available resources, level and/or obstacle difficulty, game progress, most recent results, etc.), and the prediction control component 145 may encode this data into any suitable representation. In some embodiments, the data collection component 150 and/or the prediction control component 145 may classify or quantify any of the foregoing into a corresponding vector representation.

Taking most recent results as an example, user results playing levels and obstacles may correlate with anticipated resource utilization. For example, if a user is struggling with a particular level or obstacle, it may be an indication the user may need to spend more time on that level or obstacle before advancing, whereas a user who is advancing through a particular level or obstacle with ease may indicate that the user is ready to advance to the next level or obstacle soon, and loading the next level or obstacle may require relatively more resources. As such, encoding some representation of the most recent results in a particular instance of a game (e.g., a binary measure of pass/fail, elapsed time between checkpoints, heath or other resources remaining or consumed, etc.) may be informative of anticipated resource utilization some duration of time away in the future.

In some embodiments, the data collection component 150 and/or the prediction control component 145 may collect, quantify, look up, and/or encode a representation of historical resource consumption associated with the current level or obstacle(s) being played (e.g., by all users). For example, one or measures of the historical resource utilization (e.g., network bandwidth) may be quantified relative to a corresponding distribution (e.g., percentile, quartile, etc.) and encoded in any suitable. Generally, the prediction control component 145 may quantify one or measures of the historical utilization of any resource (e.g., number, percentage, and/or type of available processing resources, memory or storage resources, networking resources) needed to support that (e.g., version of the) game, the current level, current obstacle, and/or some other aspect of the current state of the instance of the game (e.g., based on benchmarked node and/or container metrics recorded during prior instances of gameplay corresponding to the current state of the instance of the game).

As such, the prediction control component 145 may generate an encoded representation of one or more features of the current state of a particular instance of a cloud gaming title, and may apply the resulting encoded representation as an input into the corresponding one of the game-specific resource consumption model(s) 140 for that (e.g., version of the) cloud gaming title.

Accordingly, the game-specific resource consumption model for that cloud gaming title may process that input to generate a representation of how many resources that instance of the title is expected to demand at some future time. For example, the game-specific resource consumption model may be trained to predict resource utilization some duration of time in the future (e.g., 5 minutes, 10 minutes, 30 minutes, etc.). The representation of predicted resource utilization may take any suitable form and may encode any measure of predicted resource utilization. For example, the predicted resource utilization may quantify the resources (e.g., number, percentage, and/or type of available processing resources, memory or storage resources, and/or networking resources) needed to support that instance of that game's anticipated demands some duration of time away in the future. These are just a few examples, and other variations are contemplated within the scope of the present disclosure.

As such, the prediction control component 145 may obtain predictions for anticipated resource utilization for each cloud gaming user and/or each instance of each cloud gaming title being hosted in the distributed computing environment 100 (e.g., periodically and/or based on some other triggering event). Note that although the foregoing examples focus on cloud gaming, those of ordinary skill in the art will appreciate these teachings may be applied to other types of applications (e.g., content creation applications) to obtain predictions for anticipated resource utilization for each application user and/or each instance of each application being hosted in the distributed computing environment 100 (e.g., based on one or more features of a user's application session, application setup, skill or experience level, social media activity, and/or other feature of the user's application usage; based on one or more features of the current state of an instance of the application; etc.). As such, the prediction control component 145 may provide a representation of each prediction to the resource manager 155, which may use the prediction to determine and schedule an appropriate resource allocation at a corresponding future time.

Generally, the resource manager 155 may allocate resources based on a predicted resource utilization for a particular user, a predicted resource utilization for a particular instance of a particular game, and/or current resource availability. For example, the resource manager 155 may launch or scale one or more services 160 or other functions with designated resource allocations and/or constraints (e.g., re-allocating resources to users and/or instances of games with higher predicted resource utilization), assign one or more services 160 or other functions to particular machines (e.g., nodes, virtual machines) that have current availability, add one or more nodes or containers to a cluster (e.g., if the current cluster does not have enough or a desired amount of resources to support a predicted resource utilization), and/or otherwise. Examples of services 160 or other functions that the resource manager 155 may launch or scale include a microservice of the game (e.g., game services such as game servers), a microservice that otherwise facilities execution and/or delivery of the, a pod or container that runs a microservice such as one of the foregoing, a component of a resource provisioning or orchestration application or platform (e.g., a service, deployment, volume, pod, or container of KUBERNETES), and/or otherwise. By way of nonlimiting example, the resource manager 155 may launch or scale one or more game servers (e.g., running in a corresponding pod or container) with designated resource allocations and/or constraints that accommodate the predicted resource consumption for a particular user and/or game instance.

By way of nonlimiting example, a prediction may indicate that a particular user playing (or expected to play) a particular instance of a game may need a particular resource utilization (e.g., network bandwidth) at some duration of time away (e.g., 5 minutes) in the future, so the resource manager 155 may schedule a pod, container, node, or other component anticipated to have available resources (e.g., based on the availability of one or more resources for that component being classified as high, medium, or low) to accommodate that user and/or game's anticipated resource utilization at the time in the future. In some embodiments, if the predicted resource utilization is less than a current allocation, the resource manager 155 may scale down and/or reallocate the freed up resources to another user, game instance, and/or other service. In some embodiments, if the predicted resource utilization for a particular user or game is more than a current allocation, the resource manager 155 may scale up or reallocate resources from another user, game instance, and/or other service.

In some embodiments, the allocation triggering component 165 may trigger multiple predictions that are applicable to the same instance of a particular game being hosted in the distributed computing environment 100. For example, the allocation triggering component 165 may trigger a prediction using a corresponding one of the user-specific resource consumption model(s) 135 for the cloud gaming playing that game. Furthermore, the allocation triggering component 165 may trigger a prediction using a corresponding one of the game-specific resource consumption model(s) 140 for the game. In some embodiments, the resource manager 155 may combine the predictions in any suitable manner (e.g., taking some statistical measure of both predictions such as averaging or taking the maximum predicted resource utilization). In some embodiments, the models may be chained (e.g., by applying a representation of predicted resource utilization generated by one model as part of the input into the other) to generate a single predicted resource consumption. These are just a few examples, and other variations may be implemented within the scope of the present disclosure.

As such, the resource manager 155 may schedule resource allocations at corresponding future times, and may trigger the resource allocations at those future times.

Figure 2:
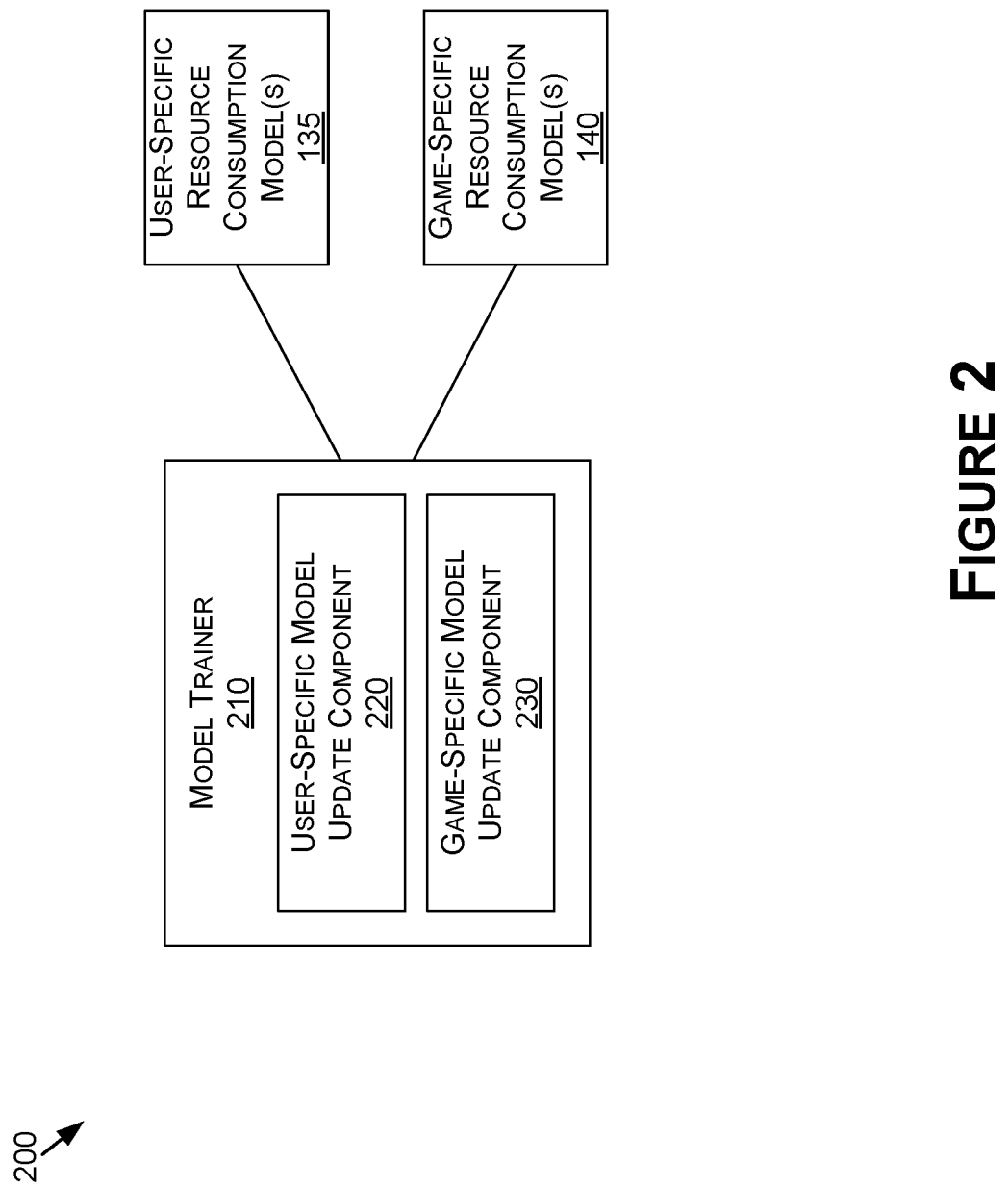
FIG. 2 is a block diagram of an example training system, in accordance with some embodiments of the present disclosure.

FIG. 2 is a block diagram of an example training system 200, in accordance with some embodiments of the present disclosure. In this example, the training system 200 includes a model trainer 210 which may be used to train the user-specific resource consumption model(s) 135 and/or the game-specific resource consumption model(s) 140. In the embodiment illustrated in FIG. 1, the model trainer 210 includes a user-specific model update component 220 and a game-specific model update component 230.

Generally, the user-specific model update component 220 may initialize each of the user-specific resource consumption model(s) 135 using a base model pre-trained using training data generated based on gaming sessions from all users. For example, the user-specific model update component 220 may use the techniques described with respect to the prediction control component 145 of FIG. 1 to generate various input data points representing one or more features of various users' gaming or application sessions, game or application setup, skill or experience level, social media activity, some time series representing feature(s) for a series of interactions, the time of day (e.g., if the use is not logged in), and/or other characteristics. For each input data point, the user-specific model update component 220 may use the techniques described with respect to the prediction control component 145 of FIG. 1 to interface with a corresponding game or application engine and/or one or more components of the distributed computing environment 100 to observe and encode a corresponding ground truth resource utilization. As such, the user-specific model update component 220 may pre-train a user-specific resource consumption model using training data for all users. This way, the pre-trained model may be used as a base model for each user, which the user-specific model update component 220 may individualize over time using training data generated based on gaming or application sessions for the particular user the user-specific resource consumption model is modeling. For example, the user-specific model update component 220 may generate various pairs of input data points and corresponding ground truth training data for each specific user over time, and periodically (e.g., whenever N data points are available, once every interval of time) update the model for each user using that user's specific data.

Generally, the game-specific model update component 230 may train each of the game-specific resource consumption model(s) 140 using training data generated using gaming sessions for all players for the (e.g., version of the) game being modeled. Taking a particular cloud gaming title as an example, the game-specific model update component 230 may use the techniques described with respect to the prediction control component 145 of FIG. 1 to generate various input data points representing one or more features of various states of various instances of the cloud gaming title played by various players over time. For each input data point, the game-specific model update component 230 may use the techniques described with respect to the prediction control component 145 of FIG. 1 to interface with a corresponding game or application engine and/or one or more components of the distributed computing environment 100 to observe and encode a corresponding ground truth resource utilization. As such, the game-specific model update component 230 may train a game-specific (or application-specific) resource consumption model using training data for any number of users playing that game (or using that application). As such, in some embodiments, the game-specific model update component 230 may train one model per cloud gaming title, and/or one model for each version of each cloud gaming title. Note that since the state of different games or different versions of games may be quantifiable in different ways, different models for different games enables the different models to accept different representations of the states of different games. Once each model has been deployed, the game-specific model update component 230 may continue to generate various pairs of input data points and corresponding ground truth training data for each specific game and/or each version of each game over time, and may update each model periodically (e.g., whenever N data points are available, once every interval of time). In some embodiments, when a new version of a game is released, the game-specific model update component 230 may use a previous version of the game as a base model and update the base model using training data generated based on the new version. These are just a few examples, and other ways of generating and/or training the user-specific resource consumption model(s) 135 and/or the game-specific resource consumption model(s) 140 are contemplated within the scope of the present disclosure.

Figure 3:
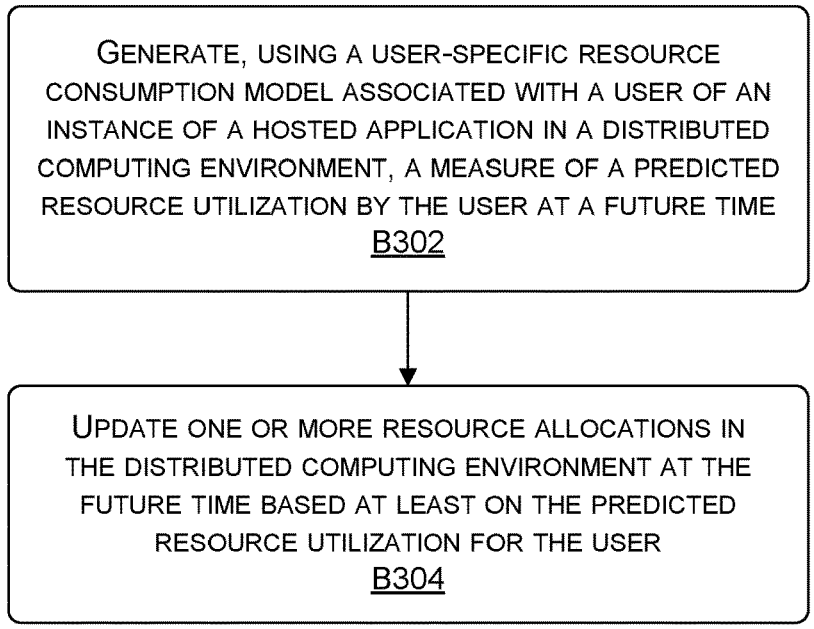
FIG. 3 is a flow diagram illustrating a method of updating one or more resource allocations using a user-specific resource consumption model, in accordance with some embodiments of the present disclosure.
Figure 4:
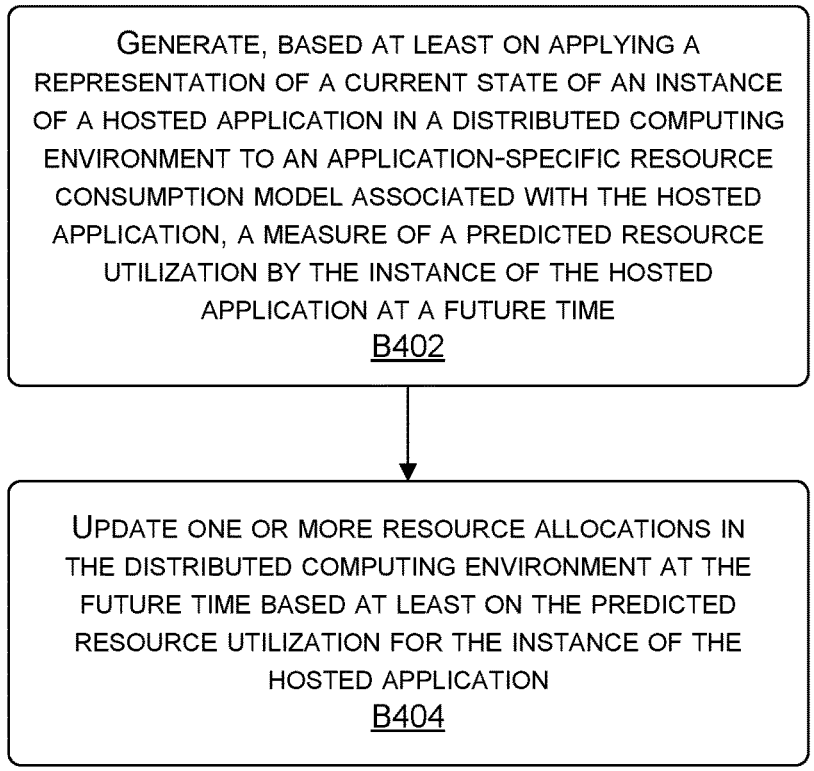
FIG. 4 is a flow diagram illustrating a method of updating one or more resource allocations using an application-specific resource consumption model, in accordance with some embodiments of the present disclosure.

Now referring to FIGS. 3 and 4, each block of methods 300 and 400, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods 300 and 400 are described, by way of example, with respect to the distributed computing environment 100 of FIG. 1.

However, these methods may additionally or alternatively be executed by any one system, or any combination of systems, including, but not limited to, those described herein.

FIG. 3 is a flow diagram showing a method 300 of updating one or more resource allocations using a user-specific resource consumption model, in accordance with some embodiments of the present disclosure. The method 300, at block B302, includes generating, using a user-specific resource consumption model associated with a user of an instance of a hosted application in a distributed computing environment, a measure of a predicted resource utilization by the user at a future time. For example, with respect to the distributed computing environment 100 of FIG. 1, the prediction control component 145 may receive an instruction to predict a future resource utilization using one of the user-specific resource consumption model(s) 135, and in response, may use the data collection component 150 to retrieve the requisite data for that model, encode that data into a format that the model understands, and apply the encoded input to an API endpoint for that model to trigger and return the prediction. Taking one of the user-specific resource consumption model(s) 135 for a particular cloud gaming user as an example, that user's resource consumption model may predict a representation of a measure of that cloud gaming user's anticipated (e.g., processing, memory or storage, and/or networking) resource utilization at some duration of time away (e.g., 5 minutes) in the future based on an input representation of one or more features of the user's current session (e.g., length of play, time of day, login time, a statistical measure of the resource utilization associated with the current session), game or application setup (e.g., gameplay or audio settings), skill or experience level (or some other representation of anticipated speed of gameplay), social media activity (e.g., whether the user is browsing or messaging in a page, channel, room, or discussion board associated with gaming or the active game they are playing; a measure of messaging activity on such a page, channel, room, or discussion board), some time series representing feature(s) for a series of interactions, the time of day (e.g., if the use is not logged in), and/or other characteristics.

The method 300, at block B304, includes updating one or more resource allocations in the distributed computing environment at the future time based at least on the predicted resource utilization for the user. For example, with respect to the distributed computing environment 100 of FIG. 1, the prediction control component 145 may provide a representation of the predicted resource utilization to the resource manager 155, which may use the predicted utilization to determine and schedule an appropriate resource allocation at a corresponding future time. For example, the resource manager 155 may launch or scale one or more services 160 or other functions with designated resource allocations and/or constraints (e.g., re-allocating resources to users and/or corresponding instances of games with higher predicted resource utilization), assign one or more services 160 or other functions to particular machines (e.g., nodes, virtual machines) that have current availability, add one or more nodes or containers to a cluster (e.g., if the current cluster does not have enough or a desired amount of resources to support a predicted resource utilization), and/or otherwise. Examples of services 160 or other functions that the resource manager 155 may launch or scale include a microservice of a game or other application (e.g., game services such as game servers), a microservice that otherwise facilities execution and/or delivery of the game or other application, a pod or container that runs a microservice such as one of the foregoing, a component of a resource provisioning or orchestration application or platform (e.g., a service, deployment, volume, pod, or container of KUBERNETES), and/or otherwise. By way of nonlimiting example, the resource manager 155 may launch or scale one or more game or application servers (e.g., running in a corresponding pod or container) with designated resource allocations and/or constraints that accommodate the predicted resource utilization for a particular user.

FIG. 4 is a flow diagram showing a method 400 of updating one or more resource allocations using an application-specific resource consumption model, in accordance with some embodiments of the present disclosure. The method 400, at block B402, includes generating, based at least on applying a representation of a current state of an instance of a hosted application in a distributed computing environment to an application-specific resource consumption model associated with the hosted application, a measure of a predicted resource utilization by the instance of the hosted application at a future time. For example, with respect to the distributed computing environment 100 of FIG. 1, the prediction control component 145 may receive an instruction to predict a future resource utilization using one of the game-specific resource consumption model(s) 140 (or some other application-specific resource consumption model), and in response, may use the data collection component 150 to retrieve the requisite data for that model, encode that data into a format that the model understands, and apply the encoded input to an API endpoint for that model to trigger and return the prediction. Taking one of the game-specific resource consumption model(s) 140 for a particular (e.g., version of a) cloud gaming title as an example, that game's resource consumption model may predict a representation of a measure of that game's anticipated resource utilization (e.g., utilization of processing resources, memory or storage resources, and/or networking resources) at some duration of time away (e.g., 5 minutes) in the future based on an input representation of one or more features of the current state of the instance of the game, such as the current level being played in that instance of the game, a representation (e.g., classification) of one or more current obstacles or other objects visible at a current time, user results playing a corresponding level(s) and/or obstacle(s) (e.g., a binary measure of pass/fail, elapsed time between checkpoints, heath or other resources remaining or consumed, etc.), metadata quantifying one or more aspects of a corresponding level(s) and/or obstacle(s) (e.g., level and/or obstacle difficulty, current and/or historical resource utilization associated with that level or obstacle), game progress (e.g., percent completion), enabled game or application features (e.g., enabled light transport simulation features, such as global illumination, subsurface scattering, real-time reflections and refractions, ambient occlusion, etc.), some combination thereof, and/or other features that may correlate with anticipated resource utilization.

The method 400, at block B404, includes updating one or more resource allocations in the distributed computing environment at the future time based at least on the predicted resource utilization for the instance of the hosted application. For example, with respect to the distributed computing environment 100 of FIG. 1, the prediction control component 145 may provide a representation of the predicted resource utilization to the resource manager 155, which may use the predicted utilization to determine and schedule an appropriate resource allocation at a corresponding future time.

Example Content Streaming System

Now referring to FIG. 5, FIG. 5 is an example system diagram for a content streaming system 500, in accordance with some embodiments of the present disclosure. FIG. 5 includes application server(s) 502 (which may include similar components, features, and/or functionality to the example computing device 600 of FIG. 6), client device(s) 504 (which may include similar components, features, and/or functionality to the example computing device 600 of FIG. 6), and network(s) 506 (which may be similar to the network(s) described herein). In some embodiments of the present disclosure, the system 500 may support an application session corresponding to a game streaming application (e.g., NVIDIA GEFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 500, for an application session, the client device(s) 504 may only receive input data in response to inputs to the input device(s), transmit the input data to the application server(s) 502, receive encoded display data from the application server(s) 502, and display the display data on the display 524. As such, the more computationally intense computing and processing may be offloaded to the application server(s) 502 (e.g., rendering—in particular ray or path tracing—for graphical output of the application session may be executed by GPU(s) of the application server(s) 502, such as a game server(s)). In other words, the application session may be streamed to the client device(s) 504 from the application server(s) 502, thereby reducing the requirements of the client device(s) 504 for graphics processing and rendering.

For example, with respect to an instantiation of an application session, a client device 504 may be displaying a frame of the application session on the display 524 based on receiving the display data from the application server(s) 502. The client device 504 may receive an input to one of the input device(s) and generate input data in response. The client device 504 may transmit the input data to the application server(s) 502 via the communication interface 520 and over the network(s) 506 (e.g., the Internet), and the application server(s) 502 may receive the input data via the communication interface 518. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 512 may render the application session (e.g., representative of the result of the input data) and the render capture component 514 may capture the rendering of the application session as display data (e.g., as image data capturing the rendered frame of the application session). The rendering of the application session may include ray or path-traced lighting and/or shadow effects, computed using one or more parallel processing units-such as GPUs, which may further employ the use of one or more dedicated hardware accelerators or processing cores to perform ray or path-tracing techniques—of the application server(s) 502. In some embodiments, one or more virtual machines (VMs)—e.g., including one or more virtual components, such as vGPUs, vCPUs, etc.—may be used by the application server(s) 502 to support the application sessions. The encoder 516 may then encode the display data to generate encoded display data and the encoded display data may be transmitted to the client device 504 over the network(s) 506 via the communication interface 518. The client device 504 may receive the encoded display data via the communication interface 520 and the decoder 522 may decode the encoded display data to generate the display data. The client device 504 may then display the display data via the display 524.

One possible application in which the present techniques may be used is in cloud gaming. Cloud gaming, also known as game streaming or cloud gaming services, hosts video games on remote servers located in data centers. These servers are typically equipped with high-performance graphics cards and CPUs, serving as the infrastructure where the games are installed and run. Users may access and play games through client software or apps on their devices such as low-end PCs, smartphones, tablets, and smart TVs. When a user selects a game, a request may be sent to a cloud server hosting that specific title. An instance of the game runs on the server, and the video and audio output may be encoded in real-time and streamed to the user's device. User input, such as keyboard, mouse, or controller commands, may be transmitted to the cloud server, which may process these inputs and updates the game accordingly, creating a responsive gaming experience. The quality of the game stream, including resolution and frame rate, typically depends on the user's internet connection speed and the capabilities of the cloud server. This approach reduces or eliminates the need for users to own and maintain high-end gaming hardware and allows them to enjoy gaming experiences on devices that may not have the processing power to run the games locally.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as one or more large language models (LLMs), systems for performing light transport simulation, systems for performing collaborative content creation for 3D assets, systems implemented at least partially using cloud computing resources, and/or other types of systems.

Example Computing Device

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
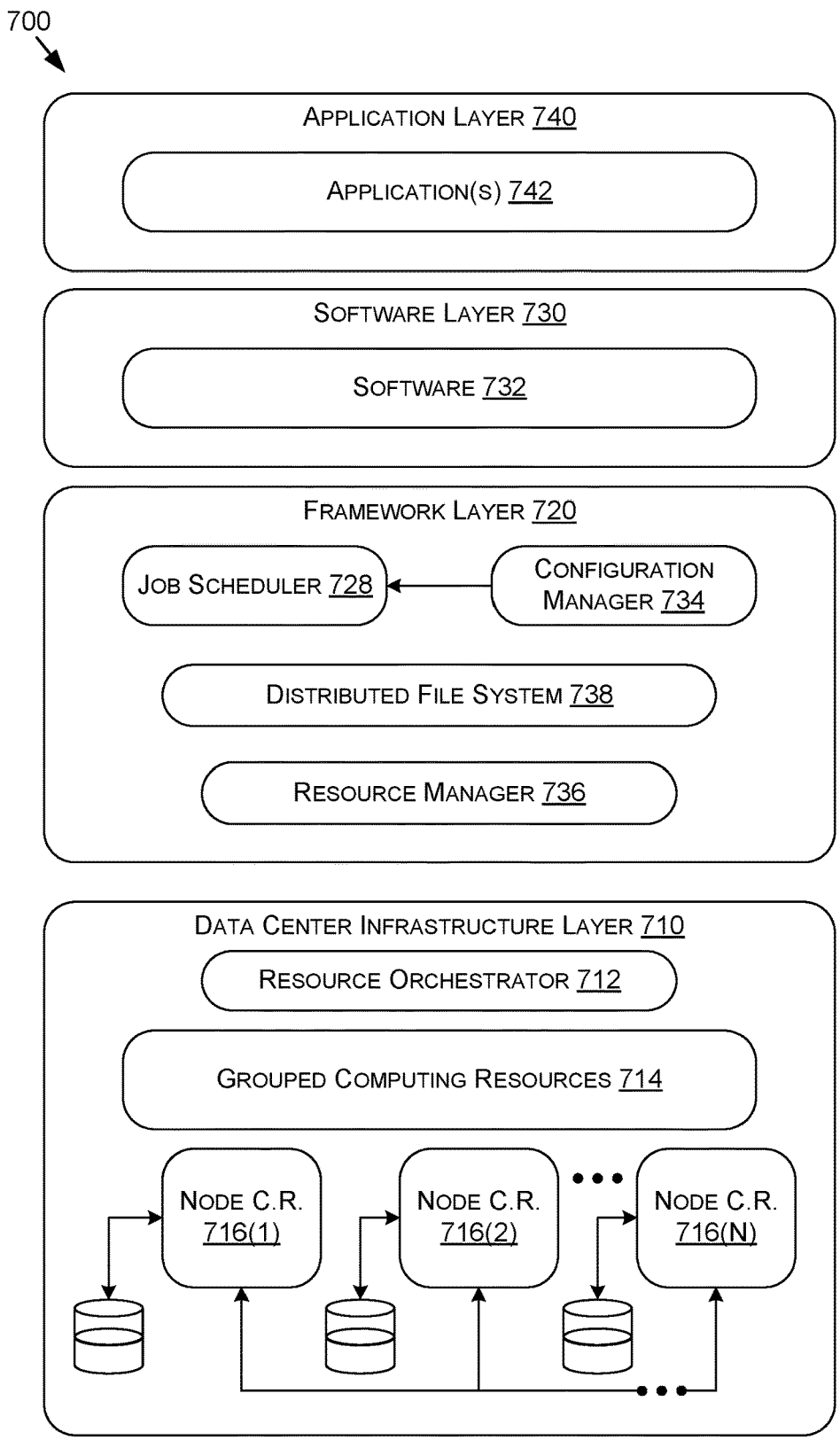
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 728, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 728 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 728. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising one or more processing units and memory to:
provide, to an application-specific neural network that models future resource utilization by a hosted application in a distributed computing environment, an encoding of a current state of an instance of the hosted application;

generate, based at least on processing the encoding of the current state of the instance of the hosted application using the application-specific neural network, an encoding of a measure of a predicted future resource utilization by the instance of the hosted application starting at a future time;

update one or more resource allocations in the distributed computing environment at the future time based at least on the measure of the predicted future resource utilization by the instance of the hosted application; and trigger one or more updated resource allocations in the distributed computing environment based at least on a user of the instance of the hosted application loading a different hosted application in the distributed computing environment.

2. The one or more processors of claim 1, wherein the hosted application corresponds to a game streaming application streaming a game, wherein the one or more processing units and the memory are further to generate the measure of the predicted future resource utilization by the instance of the game based at least on applying a representation of a current level in the instance of the game or a most recent level played by the user of the instance of the game to the application-specific neural network.

3. The one or more processors of claim 1, wherein the hosted application corresponds to a game streaming application streaming a game, wherein the one or more processing units and the memory are further to generate the measure of the predicted future resource utilization by the instance of the game based at least on applying a representation of at least one of one or more objects visible to the user at a current time or one or more light transport simulation features enabled in the instance of the game to the application-specific neural network.

4. The one or more processors of claim 1, wherein the hosted application corresponds to a game streaming application streaming a game, wherein the one or more processing units and the memory are further to generate the measure of the predicted future resource utilization by the instance of the game based at least on applying a representation of one or more user results playing a current level or obstacle in the instance of the game to the application-specific neural network.

5. The one or more processors of claim 1, wherein the hosted application corresponds to a game streaming application streaming a game, wherein the one or more processing units and the memory are further to generate the measure of the predicted future resource utilization by the instance of the game based at least on applying a representation of at least one of a difficulty or resource consumption associated with a current level or obstacle in the instance of the game, or a game progress in the instance of the game, to the application-specific neural network.

6. The one or more processors of claim 1, wherein the hosted application corresponds to a collaborative content creation application streaming one or more assets, wherein the one or more processing units and the memory are further to generate the measure of the predicted future resource utilization by the instance of the collaborative content creation application based at least on applying a representation of one or more concurrently executing heterogeneous content creation applications with at least one asset accessible by the user of the instance of the collaborative content creation application to the application-specific neural network.

7. The one or more processors of claim 1, wherein the hosted application corresponds to a game streaming application streaming a game, wherein the one or more processing units and the memory are further to trigger one or more updated resource allocations in the distributed computing environment based at least on the user of the instance of the game reaching a new level, region, or zone in the game.

8. The one or more processors of claim 1, wherein the application-specific neural network is unique to a version of the instance of the hosted application.

9. The one or more processors of claim 1, wherein the application-specific neural network models the future resource utilization by the hosted application up to one day in the future.

10. The one or more processors of claim 1, wherein the application-specific neural network models the future resource utilization by the hosted application up to one hour in the future.

11. The one or more processors of claim 1, wherein the one or more processors are comprised in at least one of:
a system for performing simulation operations;
a system for performing digital twin operations;
a system for performing light transport simulation;
a system for performing collaborative content creation for 3D assets;
a system for performing deep learning operations;
a system for performing remote operations;
a system for performing real-time streaming;
a system for generating or presenting one or more of augmented reality content, virtual reality content, or mixed reality content;
a system implemented using an edge device;
a system implemented using a robot;
a system for generating synthetic data;
a system for generating synthetic data using AI;
a system incorporating one or more virtual machines (VMs);
a system implemented at least partially in a data center; or
a system implemented at least partially using cloud computing resources.

12. A system comprising one or more processing units and memory to:
generate, based at least on applying an encoded input representation of a current state of an instance of a hosted application in a distributed computing environment to an application-specific neural network that models future resource consumption by the hosted application, an encoded output representation of a predicted future resource consumption by the instance of the hosted application;

trigger one or more resource allocations in a distributed computing environment based at least on the predicted future resource consumption by the instance of the hosted application; and trigger one or more updated resource allocations in the distributed computing environment based at least on a user of the instance of the hosted application loading a different hosted application in the distributed computing environment.

13. The system of claim 12, wherein the hosted application corresponds to a game streaming application streaming a game, wherein the one or more processing units and the memory are further to generate the predicted future resource consumption by the instance of the game based at least on applying a representation of a current level in the instance of the game or a most recent level played by the user of the instance of the game to the application-specific neural network.

14. The system of claim 12, wherein the hosted application corresponds to a game streaming application streaming a game, wherein the one or more processing units and the memory are further to generate the predicted future resource consumption by the instance of the game based at least on applying a representation of one or more objects visible to the user at a current time or one or more light transport simulation features enabled in the instance of the game to the application-specific neural network.

15. The system of claim 12, wherein the hosted application corresponds to a game streaming application streaming a game, wherein the one or more processing units and the memory are further to generate the predicted future resource consumption by the instance of the game based at least on applying a representation of at least one of one or more user results playing a current level or obstacle in the instance of the game, or a game progress in the instance of the game, to the application-specific neural network.

16. The system of claim 12, wherein the hosted application corresponds to a collaborative content creation application streaming one or more assets, wherein the one or more processing units and the memory are further to generate the predicted future resource consumption by the instance of the collaborative content creation application based at least on applying a representation of one or more concurrently executing heterogeneous content creation applications with at least one asset accessible by the user of the instance of the collaborative content creation application to the application-specific neural network.

17. The system of claim 12, wherein the system is comprised in at least one of:
- a system for performing simulation operations;
- a system for performing digital twin operations;
- a system for performing light transport simulation;
- a system for performing collaborative content creation for 3D assets;
- a system for performing deep learning operations;
- a system for performing remote operations;
- a system for performing real-time streaming;
- a system for generating or presenting one or more of augmented reality content, virtual reality content, or mixed reality content;
- a system implemented using an edge device;
- a system implemented using a robot;
- a system for generating synthetic data;
- a system for generating synthetic data using AI;
- a system incorporating one or more virtual machines (VMs);
- a system implemented at least partially in a data center; or
- a system implemented at least partially using cloud computing resources.

18. A method comprising:
generating, based at least on applying a representation of a current state of an instance of a hosted application in a distributed computing environment to an application-specific neural network that models future resource utilization by the hosted application, a representation of a predicted future resource utilization by the instance of the hosted application starting at a future time;
configuring an update to the distributed computing environment, based at least on the predicted future resource utilization by the instance, to trigger at the future time; and
configuring one or more subsequent updates to the distributed computing environment based at least on a user of the instance of the hosted application loading a different hosted application in the distributed computing environment.

19. The method of claim 18, wherein the method is performed by at least one of:
- a system for performing simulation operations;
- a system for performing digital twin operations;
- a system for performing light transport simulation;
- a system for performing collaborative content creation for 3D assets;
- a system for performing deep learning operations;
- a system for performing remote operations;
- a system for performing real-time streaming;
- a system for generating or presenting one or more of augmented reality content, virtual reality content, or mixed reality content;
- a system implemented using an edge device;
- a system implemented using a robot;
- a system for generating synthetic data;
- a system for generating synthetic data using AI;
- a system incorporating one or more virtual machines (VMs);
- a system implemented at least partially in a data center; or
- a system implemented at least partially using cloud computing resources.

* * * * *